(12) United States Patent
Jackson et al.

(10) Patent No.: US 11,711,222 B1
(45) Date of Patent: *Jul. 25, 2023

(54) SYSTEMS AND METHODS FOR PROVIDING AUTHENTICATION TO A PLURALITY OF DEVICES

(71) Applicant: Stripe, Inc., San Francisco, CA (US)

(72) Inventors: Carl Jackson, San Francisco, CA (US); Bryan Berg, San Francisco, CA (US); David Terrence Bartley, San Francisco, CA (US); Evan Broder, San Francisco, CA (US)

(73) Assignee: Stripe, Inc., San Francisco, CA (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/234,456

(22) Filed: Apr. 19, 2021

Related U.S. Application Data

(63) Continuation of application No. 16/518,557, filed on Jul. 22, 2019, now Pat. No. 10,985,925, which is a
(Continued)

(51) Int. Cl.
*H04L 9/32* (2006.01)
*H04L 9/40* (2022.01)
*H04L 9/14* (2006.01)

(52) U.S. Cl.
CPC ............ *H04L 9/3263* (2013.01); *H04L 9/14* (2013.01); *H04L 9/3247* (2013.01);
(Continued)

(58) Field of Classification Search
CPC ........... H04L 2209/127; H04L 63/0428; H04L 63/083; H04L 9/14; H04L 9/3247; H04L 9/3263; H04L 9/3268; H04L 9/3271
See application file for complete search history.

(56) References Cited

U.S. PATENT DOCUMENTS

| 7,076,655 | B2 * | 7/2006 | Griffin | G06F 21/53 726/17 |
| 7,587,595 | B2 * | 9/2009 | Scarlata | G06F 21/74 713/193 |

(Continued)

OTHER PUBLICATIONS

Search Query Report from IP.com (performed Mar. 15, 2023) (Year: 2023).*

(Continued)

*Primary Examiner* — Sharon S Lynch
(74) *Attorney, Agent, or Firm* — Womble Bond Dickinson (US) LLP

(57) ABSTRACT

A method and apparatus for a certificate authority system providing authentication to a plurality of devices associated with an organization are described. The method may include receiving, at the certificate authority system, a request from a device to sign authentication information of the device, wherein the device is associated with the organization. The method may also include sending a challenge to the device to perform an action with a system other than the certificate authority system, and receiving the response to the challenge from the device. Furthermore, the method may include verifying that the response was generated correctly based on the challenge, and signing the authentication information of the device with one or more keys of the certificate authority system as an authentication of an identity of the device.

18 Claims, 5 Drawing Sheets

Related U.S. Application Data continuation of application No. 16/235,509, filed on Dec. 28, 2018, now Pat. No. 10,404,476, which is a continuation of application No. 15/979,021, filed on May 14, 2018, now Pat. No. 10,193,697, which is a continuation of application No. 15/480,057, filed on Apr. 5, 2017, now Pat. No. 9,992,029.

(52) U.S. Cl.
CPC .......... *H04L 9/3268* (2013.01); *H04L 9/3271* (2013.01); *H04L 63/0428* (2013.01); *H04L 63/083* (2013.01); *H04L 2209/127* (2013.01)

(56) References Cited

U.S. PATENT DOCUMENTS

| | | | | |
|---|---|---|---|---|
| 7,590,867 | B2* | 9/2009 | Scarlata | G06F 21/53 713/193 |
| 7,636,442 | B2* | 12/2009 | Scarlata | H04L 63/0823 380/283 |
| 7,895,642 | B1* | 2/2011 | Larson | H04L 63/20 718/1 |
| 8,151,262 | B2* | 4/2012 | Challener | G06F 9/45558 726/19 |
| 8,219,496 | B2 | 7/2012 | Pearson | |
| 8,413,147 | B2* | 4/2013 | Shen | G06F 9/45558 718/1 |
| 9,087,196 | B2* | 7/2015 | Wood | G06F 21/57 |
| 9,154,480 | B1 | 10/2015 | Juels | |
| 9,230,081 | B2* | 1/2016 | Smith | G06F 21/57 |
| 9,391,980 | B1* | 7/2016 | Krahn | G06F 21/57 |
| 9,578,017 | B2* | 2/2017 | Ferguson | H04L 63/0428 |
| 9,736,154 | B2* | 8/2017 | Wilson | H04L 63/0884 |
| 9,992,029 | B1* | 6/2018 | Jackson | H04L 9/3268 |
| 10,129,223 | B1* | 11/2018 | Bhattacharyya | H04L 9/0861 |
| 10,193,697 | B1* | 1/2019 | Jackson | H04L 9/3268 |
| 10,382,213 | B1* | 8/2019 | Rafn | H04L 9/3268 |
| 10,554,636 | B2* | 2/2020 | Bhattacharyya | H04L 63/0869 |
| 10,630,682 | B1* | 4/2020 | Bhattacharyya | H04L 63/061 |
| 10,839,382 | B2* | 11/2020 | Holden | H04L 9/0866 |
| 10,841,102 | B2* | 11/2020 | Nitschke | H04L 9/3297 |
| 11,552,946 | B2* | 1/2023 | Bhattacharyya | H04L 63/0869 |
| 2002/0194482 | A1* | 12/2002 | Griffin | G06F 21/57 713/176 |
| 2003/0046391 | A1 | 3/2003 | Moreh | |
| 2003/0066091 | A1 | 4/2003 | Lord | |
| 2003/0226031 | A1* | 12/2003 | Proudler | G06F 21/62 726/16 |
| 2004/0249901 | A1 | 12/2004 | Wallace | |
| 2005/0138370 | A1* | 6/2005 | Goud | G06F 21/53 713/188 |
| 2006/0020781 | A1* | 1/2006 | Scarlata | G06F 21/53 713/100 |
| 2006/0143700 | A1* | 6/2006 | Herrmann | H04L 63/166 726/14 |
| 2006/0174106 | A1* | 8/2006 | Bell | H04L 9/3271 713/156 |
| 2006/0256105 | A1* | 11/2006 | Scarlata | G06F 21/552 345/418 |
| 2006/0256106 | A1* | 11/2006 | Scarlata | H04L 63/0823 345/418 |
| 2006/0256107 | A1* | 11/2006 | Scarlata | G06F 21/53 345/418 |
| 2006/0256108 | A1* | 11/2006 | Scaralata | H04L 9/08 345/418 |
| 2007/0094493 | A1* | 4/2007 | Ali | G06F 21/34 713/156 |
| 2008/0069338 | A1* | 3/2008 | Relyea | H04L 9/3247 713/168 |
| 2008/0244569 | A1* | 10/2008 | Challener | G06F 9/45558 718/1 |
| 2009/0086977 | A1* | 4/2009 | Berggren | H04L 9/3263 380/279 |
| 2009/0204964 | A1* | 8/2009 | Foley | G06F 21/53 718/1 |
| 2011/0099548 | A1* | 4/2011 | Shen | G06F 9/45558 718/1 |
| 2011/0320823 | A1* | 12/2011 | Saroiu | H04L 9/3247 713/189 |
| 2012/0166795 | A1* | 6/2012 | Wood | G06F 21/57 713/189 |
| 2012/0246470 | A1* | 9/2012 | Nicolson | G06F 21/57 713/158 |
| 2013/0046976 | A1* | 2/2013 | Rosati | H04W 12/03 713/168 |
| 2014/0026179 | A1 | 1/2014 | Devarajan | |
| 2014/0108784 | A1* | 4/2014 | Pendarakis | H04L 9/3263 713/175 |
| 2014/0259125 | A1* | 9/2014 | Smith | G06F 21/57 726/5 |
| 2015/0082399 | A1* | 3/2015 | Wu | H04L 9/0897 726/10 |
| 2015/0180869 | A1* | 6/2015 | Verma | H04L 63/0861 726/4 |
| 2015/0319160 | A1* | 11/2015 | Ferguson | H04W 12/10 726/10 |
| 2016/0254918 | A1* | 9/2016 | Liu | H04L 63/0823 713/156 |
| 2017/0034168 | A1* | 2/2017 | Wilson | H04L 63/0807 |
| 2017/0054566 | A1* | 2/2017 | Nitschke | H04L 9/3268 |
| 2017/0180355 | A1* | 6/2017 | Enns | H04L 63/10 |
| 2018/0060608 | A1* | 3/2018 | Holden | H04W 12/069 |
| 2018/0181756 | A1* | 6/2018 | Campagna | H04L 9/14 |
| 2018/0219857 | A1* | 8/2018 | Bhattacharya | H04L 63/0807 |
| 2018/0324167 | A1* | 11/2018 | Mathaiyan | G06F 9/5072 |
| 2019/0097982 | A1* | 3/2019 | Bhattacharyya | H04L 9/14 |
| 2019/0349450 | A1* | 11/2019 | Brandwine | G06F 9/5077 |
| 2020/0252396 | A1* | 8/2020 | Bhattacharyya | H04L 9/0894 |
| 2021/0044441 | A1* | 2/2021 | Nitschke | H04L 9/0897 |

OTHER PUBLICATIONS

Search Query Report from IP.com (performed Dec. 23, 2020) (Year: 2020).

\* cited by examiner

SYSTEMS AND METHODS FOR PROVIDING AUTHENTICATION TO A PLURALITY OF DEVICES

RELATED APPLICATIONS

This application is a continuation of U.S. patent application Ser. No. 16/518,557, filed Jul. 22, 2019, which is a continuation of U.S. patent application Ser. No. 16/235,509, filed Dec. 28, 2018, which is a continuation of U.S. patent application Ser. No. 15/979,021, filed May 14, 2018, which is a continuation of U.S. patent application Ser. No. 15/480,057, filed Apr. 5, 2017. The disclosures of the aforementioned applications are incorporated by reference herein in their entirety.

BACKGROUND

Modern organizations typically employ a plurality of different devices for use by their employees. More recently, as networking and infrastructure virtualization become more popular, productive, and cost-effective, the organization devices may also include virtual resources (e.g., virtual servers, virtual databases, machines running virtual operating systems, etc.). These different devices, virtual and real, interact with one another to conduct the business of the organization. Such devices need to confirm that another device is who it claims to be, such that the device can be identified and/or trusted.

When a new device is provisioned to an organization's networking infrastructure, it is generally authenticated by an information technology (IT) specialist of the organization who oversees the provisioning of the new resource. After authentication, other authenticated devices of the organization may then trust the new device when interacting with it, such as by exchanging/authenticating digital certificates, verifying cryptographic keys, etc. This process of authenticating new organization devices, however, can be time consuming or even impossible in cases where virtual resources are provisioned dynamically and the IT specialist does not have access to the server running the virtual resource. As networks grow in size, and complexity, the problems associated with authenticating devices within the organization become more and more pronounced.

SUMMARY

The present disclosure is directed to a certificate authority system providing authentication to a plurality of devices, substantially as shown in and/or described in connection with at least one of the figures, as set forth more completely in the claims.

In an exemplary embodiment, a certificate authority system authenticates a plurality of devices associated with an organization. In embodiments, the authentication can include the certificate authority system signing one or more forms of authentication information for a new device of an organization. In embodiments, the authentication information can include one or more keys, certificates, passwords, serial numbers, etc. In such embodiments, the authentications can be bootstrapped to provide guarantees of trust, such that other devices of the organization can rely on the guarantees of trust (e.g., encryption keys and/or digital certificates signed by the certificate authority system) when interacting with the new device.

In embodiments, the certificate authority system receives a request from a new device of an organization to sign authentication information of the device. In response to this request, the certificate authority system sends a challenge to the new device to perform an action with a system other than the certificate authority system. In embodiments, the action will cause the new device to obtain a response to the challenge as a result of the action being performing by the system. In embodiments, the certificate authority system receives the response to the challenge from the new device, and verifies that the response was generated correctly based on the challenge. Authentication is facilitated by, for example, interacting with the device, a cloud services provider, a device manufacturer, a third party system, or any combination thereof. Then, in response to the verification, the certificate authority system signs the authentication information of the device with one or more keys of the certificate authority system to certify an identity of the device, and thereby a level of trust that is associated with the certified identity, when interacting with one or more other devices associated with the organization.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, as they are for explanation and understanding only.

DETAILED DESCRIPTION

Figure 1:
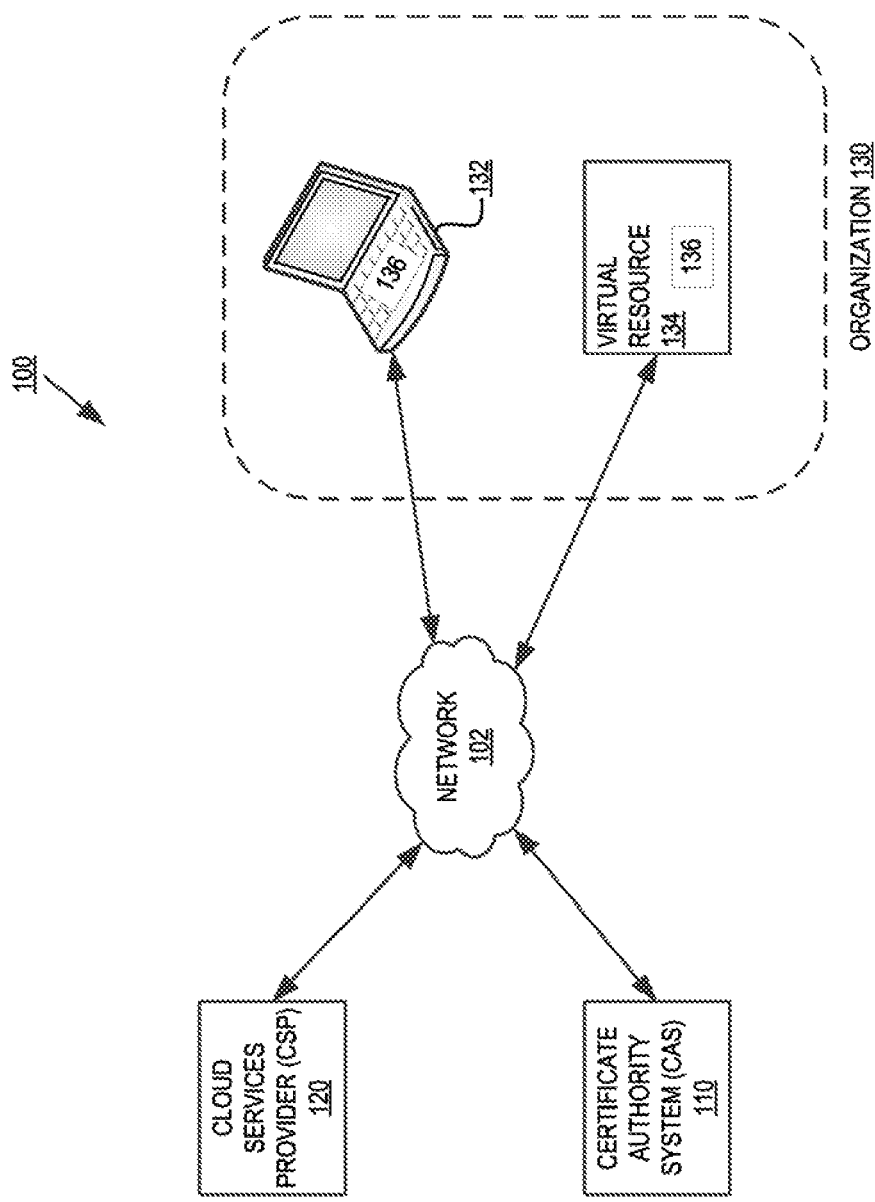
FIG. 1 is a block diagram of an exemplary system architecture for a certificate authority system providing authentication to a plurality of devices associated with an organization.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "sending", "verifying", "signing", "instructing", "requesting", "verifying", "analyzing", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a certificate authority system providing authentication to a plurality of devices associated with an organization. In one embodiment, the system 100 includes a certificate authority system (CAS) 110, one or more devices of an organization 130 (also referred to as "organization devices"), and a cloud services provider (CSP) 120. In one embodiment, the organization 130 may include a combination of different types of devices, such as a physical computing device 132 (e.g., a laptop, smartphone, desktop computer system, tablet, wearable, etc.) and/or a virtual resource 134 (e.g., a server provisioned for the organization, a virtual desktop provisioned for an employee of the organization, etc.). The devices of the organization 130 may be geographically distributed throughout different locations, networks, etc. of organization 130, illustrated by the dashed line surrounding organization 130. The CAS 110 and CSP 120 may also be centralized or distributed computing systems, such as one or more server computer systems, desktop computer systems, etc.

Although not illustrated, any number of physical computing devices, virtual resources, systems running CSPs, and systems running CASs may be utilized consistent with the discussion herein. For example, as new employees are added to an organization, as new hardware devices are acquired for existing organization employees, etc., new physical computing devices are added to the organization 130. As another example, virtual resources may be added and removed from the organization 130 dynamically based on bandwidth requirements, availability requirements, quality of service guarantees, etc. In one embodiment, the virtual resources are provisioned by CSP 120. Furthermore, organization 130 may utilize the services of different CSPs for different purposes (e.g., CSP 1 used for storage purposes, CSP 2 used for financial processing operations, CSP N used for content hosting, etc.). Although CAS 110 may be used to provide authentication to any number of organization devices using any number of CSPs, to avoid obscuring the present embodiments, the below discussion will refer to exemplary physical computing device 132, virtual resource 134, and CSP 120.

The organization devices (e.g. physical computing device 132 and virtual resource 134) of organization 130, CSP 120, and CAS 110 may be coupled to a network 102 and communicate with one another using any of the standard protocols for the exchange of information. However, due to the sensitive nature of the authentication processes being performed, in embodiments, the organizational devices, CSP 120 and CAS 110 communicate with each other using protocols for the secure exchange of information, such as Transport Layer Security (TLS), Secure Sockets Layer (SSL), Secure Shell (SSH), etc. In one embodiment, one or more of the organization devices, CSP 120 and CAS 110 may run on one Local Area Network (LAN) and may be incorporated into the same physical or logical system, or different physical or logical systems. Alternatively, the devices of organization 130, CSP 120 and CAS 110 may reside on different LANs, wide area networks, cellular telephone networks, etc. that may be coupled together via the Internet but separated by firewalls, routers, and/or other network devices. In one embodiment, CAS 110 and CSP 120 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In embodiments, CAS 110 is responsible for administering trust to the various physical and virtual devices of organization 130. Organization as used herein refers to a corporation, business, governmental entity, educational entity, etc., and the users that use various organization devices. For example, a corporation having a plurality of devices desires to ensure that each organization device is trustworthy, and that device permissions are reliable when interacting with other organization devices. In one embodiment, CAS 110 therefore performs an authentication for each organization device as the organization devices are added to, exchanged, user's changed, roles changed, privileges changed, etc. within, the organization 130. As will be discussed in greater detail below, authentication is provided by CAS 110 by verifying the identity of new devices using a challenge procedure, and optionally for virtual resources, verifying that one or more parameters of the virtual resources correspond with preconfigured (trusted) parameters. In embodiments, authentication of a device's identity is a confirmation by the CAS 110 that the device is who they say they are (e.g., confirmation that a server is in fact an API server with ID i-96e7z44p, confirmation that an image of a virtual machine OS with ID XYZ123 has certain trusted configuration parameters, confirmation that a new user is certified to use a device, etc.). Based upon that authentication of the device's identity, an appropriate trust level associated with the authenticated identity is also confirmed.

Thus, other organization devices can be confident in the new device's identity, and a level of trust level associated with that identity, when interacting with the new device authenticated by the CAS 110 according to the techniques discussed herein.

In one embodiment, when virtual resource 134 is provisioned (e.g., by CSP 120 or another CSP), besides the device image, configuration parameters, etc., a CAS client 136 is executed by virtual resource 134. Similarly, when physical device 132 is added to an organization's network, a CAS client 136 is installed and run on the physical device 132. The new virtual resource and new physical device are referred to herein as new devices. CAS client 136 of the new device may provide the CAS 110 with device identifiers, such as credentials generated by CSP 120 upon the device being provisioned, credentials generated for a new physical device being added to a network, identifiers indicative of a device or usage location, identifiers indicative of a role of a user of the new device, as well as other credentials/identifiers enabling a usage context of the new device to be determined. Furthermore, one or more cryptographic keys, certificates, passwords, serial numbers, etc. of the new device may also be provided to the CAS 110.

In embodiments, based on the received identifiers, keys, etc. CAS 110 instructs CSP 120 to allow the new device to perform an action using the services of the CSP 120. As will be discussed herein, the action will be used as part of a challenge process used by CAS 110 to determine whether or not the new device can be trusted within organization 130. In one embodiment, the CAS 110 communicates instructions to CSP 120 that include the identifiers of the new device that enable CSP 120 to recognize the new device when later contacted by the new device, as discussed below. In one embodiment, the action may include the CSP 120 performing an encryption action, retrieving data from a location within CSP 120, denying a request of the new device and generating an error message, etc.

Along with the instructions to the CSP 120, CAS 110 further sends instructions to the CAS client 136 of the new device to perform the action with the CSP 120. The action may include instructing the new device to contact the CSP 120 to encrypt data (e.g., a token) provided to the new device from the CAS 110, to retrieve data from a location of the CSP 120 specified by the CAS 110, to cause the new device to request that CSP 120 perform an action that CAS 110 knows will fail, as well as other actions generating a response by the CSP 120. In one embodiment, more than one action may be requested by the CAS 110 and performed by the new device and the CSP 120. As discussed herein, the request to perform the action and the results of the action being performed form the challenge and response used by CAS 110 to authenticate the new device. The new device then contacts the CSP 120 to perform the action specified by the CAS 110, and receives the results from the CSP 120. Based on the type of action being performed, the results can include encrypted data, retrieved data, an error message, etc.

In another embodiment, the new device is a physical computing device 132 that may have a trusted platform module (TPM). In embodiments, some organization devices have a TPM while others do not. However, in one embodiment, the TPM of device 132 is a secure cryptoprocessor, such as a dedicated microcontroller, that is capable of securely generating and/or storing cryptographic keys, performing remote attestation (e.g., generation of a hash key summary of hardware and software configurations), providing sealed storage, as well as other secure operations. Similar to the challenge issued to new device to perform an action with the CSP 120, in one embodiment, the functions of the TPM may also be used to perform challenge actions for generating a challenge response. For example, CAS 110 may instruct the TPM of device 132 to perform encryption using one or more of the TPM keys, use attestation checksum data to generate a further checksum value based on data supplied from CAS 110, verify an original image of the device 132 has not been changed, or a combination of these and other actions supported by the TPM. Thus, the TPM of device 132 may generate a challenge result without contacting CSP 120. However, in embodiments, a device having a TPM may receive challenges by CAS 110 that utilize both the device's TPM functionality and the CSP 120, as discussed herein.

In yet another embodiment, a new device may include a certificate of identity granted by the new device's manufacturer at the time the device was manufactured. For example, a physical computing device may have a tamper resistant or otherwise unchangeable certificate, signed by the manufacturer, included in one or more hardware and/or software components of the physical computing device at the time of manufacture. In this embodiment, CAS 110 may request the signed certificate of identity form the new device, and verify the certificate of identity by interacting with the manufacturer to verify the signature and/or certificate. CAS 110 utilizes the verification with the device's manufacturer as an indication that the identity of the new device is legitimate.

In embodiments, the new device provides the results of the action being performed to the CAS 110. The CAS 110 then verifies the results provided by the new device to determine whether they match an expected result. For example, the CAS 110 may contact the CSP 120 to decrypt encrypted data provided as a challenge result from the new device. As another example, the CAS 110 may contact the CSP 120 to verify an error message provided by the new device in response to a requested action being denied by the CSP 120. As yet another example, for a new device having a TPM, the CAS 110 may verify a checksum value purported to be generated from an attestation checksum (e.g. from certain configuration parameters and/or challenge data). As yet a further example, for a new device having a baked in certificate of identity signed by the device's manufacture, the CAS 110 may verify that the certificate of identity by interacting with the device's manufacturer. As yet a further example, the CAS 110 may contact a third party system with a request to perform the verification of the response provided by the new device and/or the result generated by the CSP 120, TPM of device 132, or device manufacturer. In embodiments, the third party system may be the CSP 120, TPM of device 132, or device manufacturer, as well as other trusted third party systems (e.g., a third party certificate authority that performs certificate authentication procedures, a third party cryptosystem that verifies encryption operations were performed correctly, a corporate server providing trusted services when interacting with a device manufacture, cloud services provider, etc., a second cloud services provider trusted by organization 130, etc.), that responds to the request with results of the third party verification.

In one embodiment, in response to the challenge being verified (e.g., the correct or expected response was provided by the new device), the CAS 110 has successfully authenticated the new device's identity, and as a result a level of trust associated with the authenticated identity, within the organization based on the new device's ability to correctly perform the challenge. In one embodiment, the CAS 110 may further determine whether the newly authenticated device satisfies additional trustworthy requirements. These additional trustworthiness requirements can include verifying with a CSP that provisioned virtual resource 134 that certain trusted configuration parameters were used to initialize the virtual resource 134 (e.g., usage of a certain trusted virtual machine image, certain virtual operating system parameters, current image and/or configuration parameters retrieved from a CSP hosting a virtual resource, etc.). The trustworthiness requirements may also include, for device 132 having a TPM, verifying that configuration parameters, software resources, hardware resources, etc. have not changed based on attestation processes performed by the TPM. Additional trustworthiness parameters may be analyzed by the CAS 110.

In one embodiment, after the new device is authenticated (e.g., by verifying a response for an interaction between the new device and a CSP 120, by verifying a response generated by a device TPM, by interacting with a device's manufacture to verify a signed certification of identity, or a combination of techniques), the CAS 110 signs authentication information of the new device, such as one or more cryptographic keys, digital certificates, passwords, serial numbers or other unique identifiers, etc. with one or more keys of the CAS 110 as an authentication of the identity of the new device. As discussed above, the CAS keys are cryptographic keys (e.g., RSA keys) that will be used to sign, for example, a digital certificate, a digital signature, etc. that can be used to assert an identity of the new device with other organization devices when signed by the CAS 110. Furthermore, in embodiments, the CAS 110 keys used to sign the new device's keys/certificates/etc. can be selected to reflect different levels of trust afforded to the authenticated identify of the new device. In embodiments, the levels of trust can encompass one or more of a permission level of the device within an organization, one or more privileges available to the new device for performing various operations within an organization, access privileges to certain resources (e.g., regional, role-based, etc.), as well as to reflect and delineate other groups of users and trust afforded thereto. That is, CAS 110 may compartmentalize keys when authenticating device identities and the trust levels associated therewith within an organization, by selecting certain keys for specific authentications based on device and/or user attributes including region, role, privileges, permissions, device type, device purpose, etc. based attributes.

In one embodiment, CAS 110 may further manage how the trust is administered with respect to organization devices after the initial authentication. In embodiments, CAS 110 may change certificate authority keys (e.g., revoke, replace, etc.) so that a previously enjoyed privilege of organization devices is removed unless authentication is performed again. Furthermore, CAS 110 may publish and/or maintain revocation lists for specific devices (e.g., to enable other organization devices to verify signed keys are still valid for a specific identified user).

Therefore, CAS 110 enables the administration of trust to new devices (virtual or real) as those new devices are added to an organization by verifying identities of the new devices, and thereby providing a confirmation as to a level of trust associated with the verified identities. Other devices (virtual or real) within the organization can then make confident trust determinations based on the trust level(s) afforded to the verified identities. Such a trust administration technique is valuable to virtualized computing environments and automated network environments that scale depending on workload, online users, during frequent and dynamic resource allocation/deallocation, etc. Furthermore, some resources within an organization (e.g., virtual resources provisioned and run at a CSP) may not be physically accessible, making manual trust administration by an IT department much more difficult.

Figure 2:
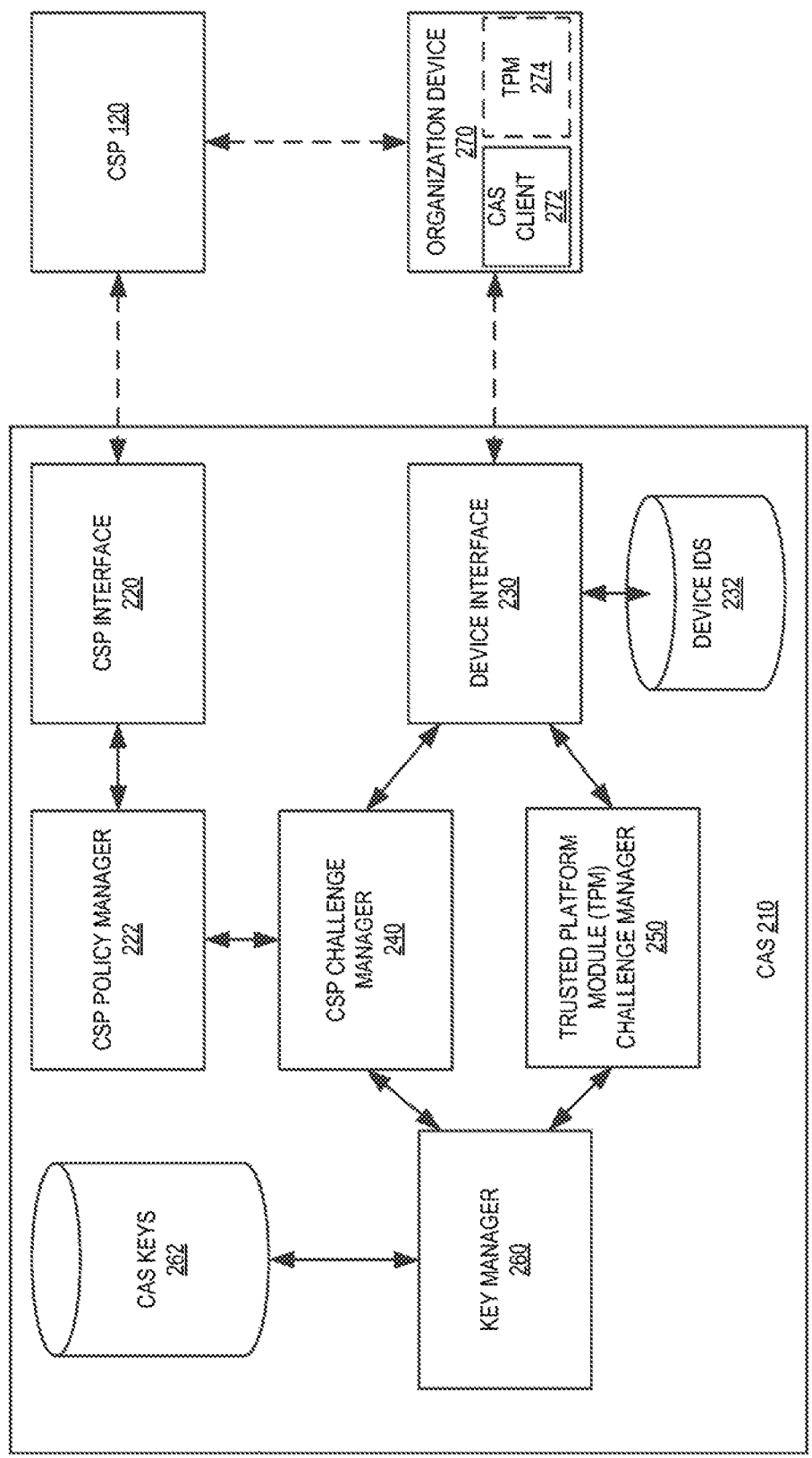
FIG. 2 is a block diagram of one embodiment of a certificate authority system, an organizational device, and a cloud services provider.

FIG. 2 is a block diagram of one embodiment of a certificate authority system (CAS) 210, an organization device 270, and a cloud services provider (CSP) 120. CAS 210, organization device 270, and CSP 120 provide additional details for the corresponding devices/systems discussed above in FIG. 1, and exchange electronic communications using one or more networks (e.g., network 102).

In one embodiment, CAS 210 includes a device interface 230, a CSP challenge manager 240, a TPM challenge manager 250, a CSP interface 220, a CSP policy manager 222, a key manager 260, and a store of CAS keys 262.

CSP 120 may be a cloud services provider system that provides virtual resource provisioning and management, data storage, processing resources, etc. In one embodiment, organization device 270 is a physical computing device having a CAS client 272 and optionally a TPM 274 and/or a manufacturer signed certification of identity. In another embodiment, organization device 270 is a virtual resource provisioned by CSP 120 or another CSP (not shown). In yet another embodiment, organization device 270 is physical computing device that utilizes one or more virtual resources (e.g., desktop or application emulation).

In one embodiment, device interface 230 receives a request from a new device of an organization for authentication (e.g., a request to sign one or more device keys/digital certificates as a verification of the device's identity). The organization may be a corporation, university, government entity, etc., and the new device is a device added to the plurality of existing organization devices. In one embodiment, organization device 270 is a physical computing device (e.g., laptop, desktop, smartphone, smartwatch, etc.) or a virtual resource (e.g., a virtual server, a virtual desktop application, etc.). As discussed herein, the organization device 270 is provided with a CAS client 272 (e.g., either by installation on the device, by inclusion in a virtual resource image, etc.), and optionally for physical devices, a TPM 274. As discussed above, the request can include a cryptographic key, such as a 4096-bit RSA key, or one or more identifiers (e.g., CSP 120 identifiers generated for a new virtual resource, physical device IDs such as MAC address, IP addresses, etc., automated networking IDs, as well as other identifiers). The device interface 230 verifies the received IDs are stored within data store 232 of device IDs for whitelisted account IDs.

Based on the device IDs received by device interface 230, CSP challenge manager 240 and/or TPM challenge manager 250 may initiate the authentication process for organization device 270. CSP challenge manager 240 instructs policy manager 222 to set a policy at CSP 120 that enables organization device 270 to perform a specific action (e.g., perform encryption, data retrieval, etc.). For example, the specific action can be to allow a device supplying a specific ID to encrypt data using a key of the CAS 210. CSP interface 220 sets the policy at CSP 120 to enable organization device 270 to perform the challenge.

In one embodiment, after setting the policy at CSP 120, CSP challenge manager 240 sends instructions to the CAS client 272 of organization device 270 to perform the action corresponding to the set policy. Furthermore, CSP challenge manager 240 specifies the parameters of the challenge, such as the type of action to be requested by device 270 at CSP 120, supplying a token (e.g., unique data) to be encrypted by CSP 120, indicating a directory or link within CSP 120 where specific data can be located, etc.

Based on the received request, CAS client 272 contacts CSP 120 by providing its identifiers (e.g. those specified by CSP policy manager 222). CAS client 272 further requests that CSP 120 perform the one or more actions (e.g., encryption, data access, etc.) according to the instructions of the CAS 210. Based on IDs supplied by CAS client 272 to verify a CSP policy allows the requested action, the CSP 120 will generate a result either by performing the action (e.g., encrypt the token, retrieve the data, etc.), or failing to perform the action (e.g., generate an error message).

The result is returned from the CSP 120 to the CAS client 272, which in turn provides the result to the CSP challenge manager 240 of CAS 210. CSP challenge manager 240 then verifies the result. For example, when the challenge results include encrypted data purported to have been generated by CSP 120 using one or more encryption keys, CSP challenge manager 240 can provide the encrypted data to CSP 120 to decrypt. Similarly, CSP challenge manager 240 can itself decrypt the data based on the key(s) used by CSP 120 during the challenge. CSP challenge manager 240 then attempts to match the decryption results with the original token in order to verify that that challenge was completed successfully by organization device 270.

In another embodiment, for a physical device with a TPM, TPM challenge manager 250 may be invoked to utilize one or more security features (e.g., attestation checksum generation, TPM encryption, etc.) of device's 270 TPM 274. In this embodiment, which may be performed instead of, or in addition to, the CSP based authentication discussed above, TPM challenge manager 250 communicates the TPM-based challenge to the CAS client 272, along with the parameters of the challenge. The challenge may include a request that the TPM 274 generate one or more platform checksums (e.g., generated based on hardware and/or software configurations), encrypt data using TPM keys, etc. Then, TPM challenge manager 250 can use these results to verify that the challenge was completed successfully (e.g., by regenerating the attestation checksum, utilizing a public key corresponding to a TPM key to decrypt data, etc.).

Based on successful authentication of organization device 270, key manager 260 may determine what CAS keys 262 are to be used to sign digital certificates/encryption keys of the organization device 270. In one embodiment, certain predefined criteria (e.g., a user's role, region, title, status within an organization, type of device being used, etc.) may be used by key manager 260 to determine how to sign the certificates. The predefined criteria, which may be determined from the organization device identifiers, enable CAS 210 to issue certificates and/or sign device keys to not only administer levels of trust to device's whose identity has been verified, but also to enable specific types of trust for specific purposes.

Figure 3:
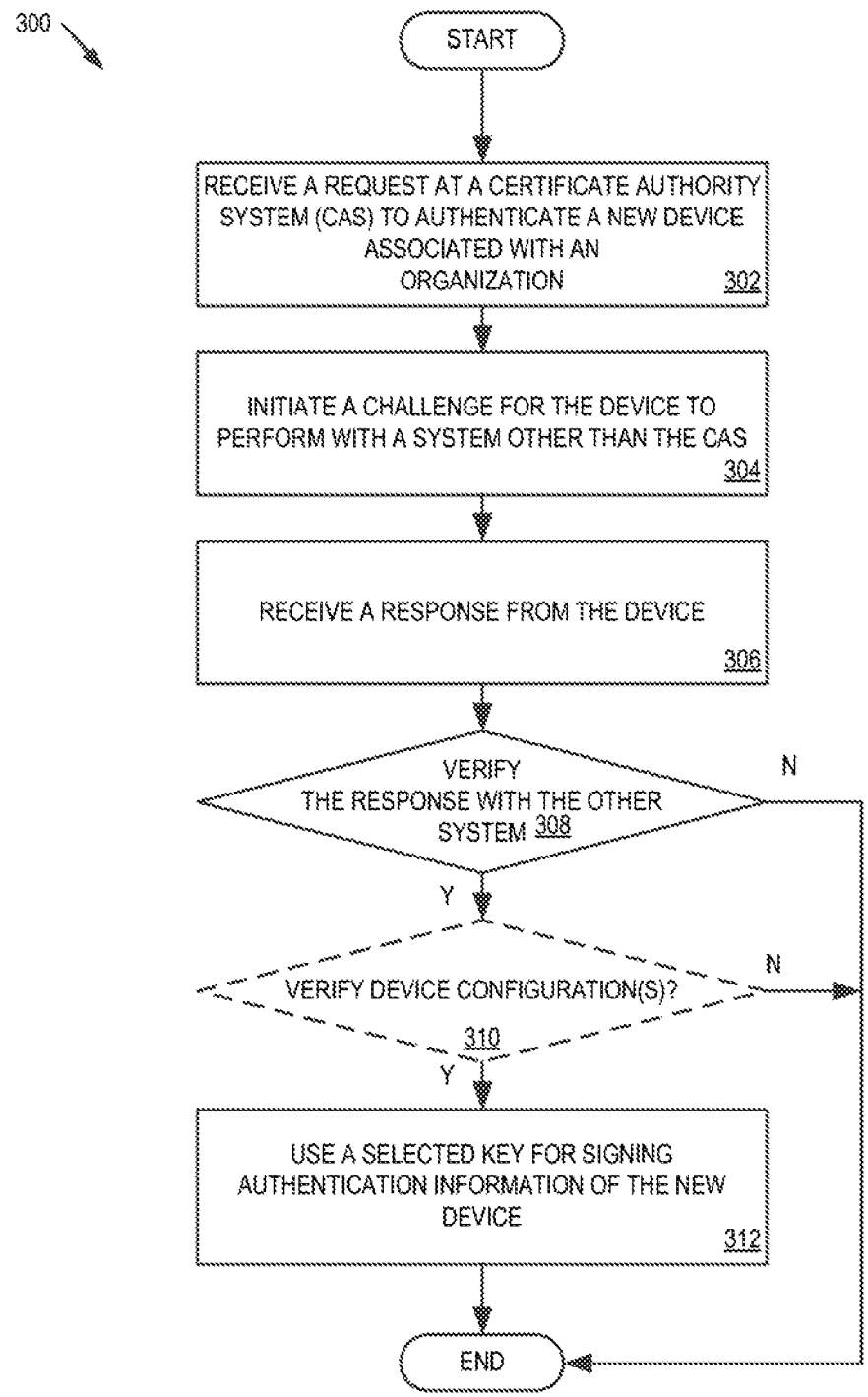
FIG. 3 is a flow diagram of one embodiment of a method for providing authentication to a plurality of devices from a certification authority system.

FIG. 3 is a flow diagram of one embodiment of a method 300 for providing authentication to a plurality of devices from a certification authority system. The method 300 is performed by processing logic that may comprise hardware (circuitry, dedicated logic, etc.), software (such as is run on a general-purpose computer system or a dedicated machine), firmware, or a combination thereof. In one embodiment, the method 300 is performed by a certificate authority system (CAS) (e.g., CAS 110 or CAS 210).

Referring to FIG. 3, processing logic begins by receiving a request at a CAS (processing block 302). In one embodiment, the request corresponds with a request issued by a new device to authenticate the new device within an organization, and sign one or more keys, digital certificates, passwords, serial numbers, etc. for the new device. The request, in embodiments, may include one or more identifiers (e.g., CSP identifiers for a virtual device, physical device identifiers, identifiers generated by an automated networking process, identifiers generated by an IT professional, etc.). Furthermore, the request can include a key or encrypted data that enable processing logic to verify that a source of the request (e.g., a key associated with the CAS known to a provisioned virtual resource, a key of a TPM, etc.).

Processing logic then initiates a challenge for the device to perform with a system other than the CAS (processing block 304). In one embodiment, the other system may be a CSP, a TPM of the device (when the device is a physical device with a TPM), a mechanism to provide a manufacturer signed certification of identity, or a combination thereof. Furthermore, more than one challenge may be initiated. In one embodiment, however, prior to initiating the challenge, processing logic verifies that the received IDs discussed above in processing block 302 are located within a whitelist of organization IDs (e.g., IDs known to be owned by the organization and added to the whitelist by a trusted source). As discussed above, the challenge may include encrypting data with one or more keys, accessing stored data at a CSP, generating checksum values by a TPM, asserting a certificate of identity, etc. by the other system as a way to generate the response to the challenge.

Processing logic receives the response to the challenge from the device (processing block 306). For example, the response can include encrypted data, retrieved data, one or more checksum values, etc. corresponding to the initiated challenges. Processing logic determine whether the response to the challenge can be verified (processing block 308). In one embodiment, processing logic determines whether the response was generated correctly. For example, processing logic may decrypt encrypted data to determine if the appropriate encryption key(s) were used to encrypt the challenge data. As another example, processing logic may generate a checksum value in an attempt to regenerate attestation checksum(s) generated by a TPM. As yet another example, processing logic may verify that the response was generated correctly by utilizing the services of a trusted third party system. When the response cannot be verified, the process ends.

However, when the response can be verified, the process continues by optionally verifying one or more device configurations (processing block 310). In one embodiment, a TPM may attest that a physical device's software and hardware configurations are consistent with an initial trusted configuration (e.g., the trusted configuration has not been tampered with). Similarly, a CSP can be queried for virtual resource image identifiers, configurations, etc. to determine whether a newly provisioned virtual resource corresponds with a trusted image, trusted configurations, etc. When the device configurations are determined not to be consistent with trusted configurations, the authentication process can be terminated, even though the new device performed the authentication process correctly. Thus, processing logic can protect against compromised devices, devices having vulnerabilities, etc., thereby providing additional guarantees of trustworthiness.

However, when the device configurations can be verified (processing block 310), processing logic uses a selected key for signing authentication information of the new device (processing block 312). In one embodiment, the selection is based on various factors that enable processing logic to compartmentalize the certifications/authentications provided to different devices. For example, users/devices from a specific geographic region may receive signed certificates/ keys/etc. that provide different access privileges than users/ devices from a different geographic region. As another example, a user/device associated with a system administrator can have certificates/keys signed with CAS keys that provide privileges not available to other user/device. Furthermore, certain keys may be associated with time limits, geography limits, etc. that constrain how the certificates/ keys can be used. Other compartmentalized, hierarchical, etc. organizations of keys can be used consistent with the discussion herein.

Figure 4A:
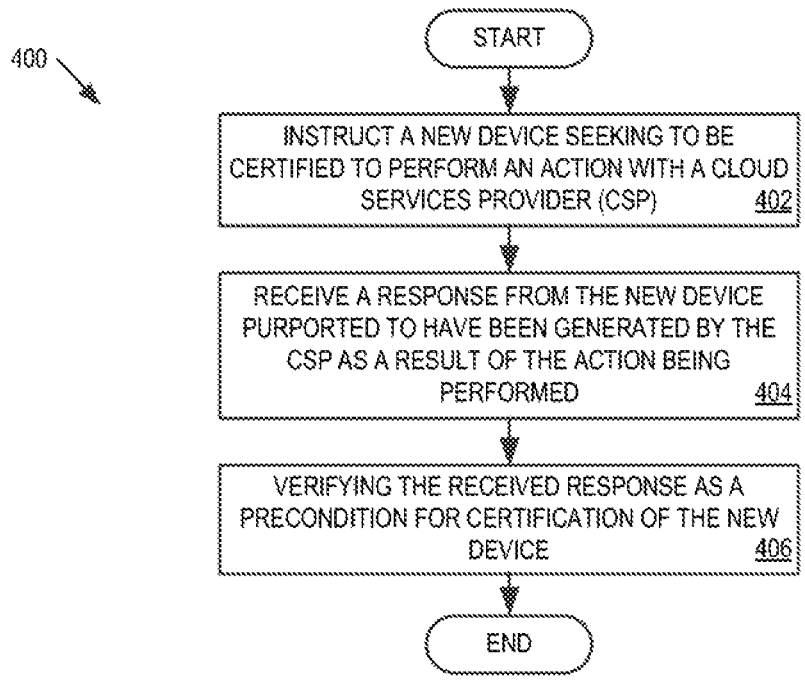
FIG. 4A is a flow diagram of one embodiment of a method for a certificate authority system to authenticate a new device using a cloud services provider.

FIG. 4A is a flow diagram of one embodiment of a method 400 for a certificate authority system to authenticate a new device using a cloud services provider. The method 400 is performed by processing logic that may comprise hardware (circuitry, dedicated logic, etc.), software (such as is run on a general-purpose computer system or a dedicated machine), firmware, or a combination thereof. In one embodiment, the method 400 is performed by a certificate authority system (CAS) (e.g., CAS 110 or CAS 210).

Referring to FIG. 4A, processing logic begins by instructing a new device seeking to be certified by a CAS to perform an action with a CSP (processing block 402). The new device may be either a virtual resource (e.g., a newly provisioned server at the CSP or other CSP) or a physical computing device (e.g., a new laptop of an organization). As discussed herein, processing logic can instruct the new device to perform various actions using the services of the CSP, such as encrypting a data token with keys of the CAS, accessing hidden data at the CSP using a specific command, data path, URL, etc., as well as performing other actions. Thus, processing logic provides the new device with instructions for the action to be performed, and data to be used for performing the action. However, as discussed above, the CAS may also instruct the new device to perform an action that is not allowed (e.g., known to fail). As discussed herein, the resulting error/failure message can be used as an authentication response.

Processing logic then receives a response from the new device purported to have been generated by the CSP as a result of the action being performed (processing block 404). Based on the nature of the original challenge, the response can include encrypted data, retrieved data, an error message, etc. Processing logic verifies the response as a precondition for certification o the new device (processing block 406). As discussed herein, verification of the proper performance of the action by the new device acts as a certification of the device's identity, location, etc. Based on this verification, as discussed herein, one or more keys/certificates of the device can be signed by the CAS to associate trust with the device when interacting with other devices of the organization.

Figure 4B:
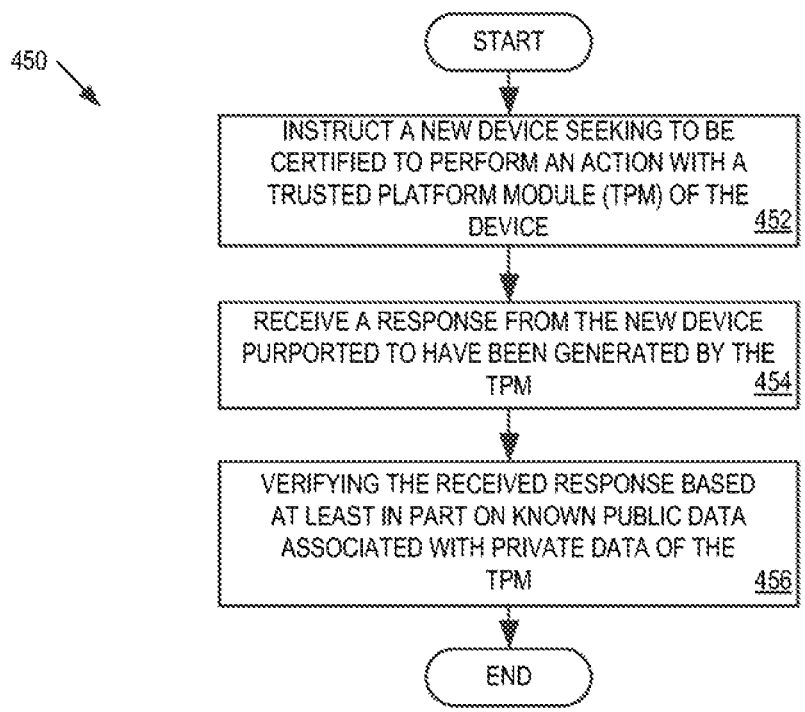
FIG. 4B is a flow diagram of one embodiment of a method for a certificate authority system to authenticate a new device using a trusted platform module.

FIG. 4B is a flow diagram of one embodiment of a method 450 for a certificate authority system to authenticate a new device using a trusted platform module. The method 450 is performed by processing logic that may comprise hardware (circuitry, dedicated logic, etc.), software (such as is run on a general-purpose computer system or a dedicated machine), firmware, or a combination thereof. In one embodiment, the method 400 is performed by a certificate authority system (CAS) (e.g., CAS 110 or CAS 210).

Referring to FIG. 4B, processing logic begins by instructing a new device seeking to be certified by a CAS to perform an action with a TPM of the device (processing block 452). As discussed herein, the TPM is a secure cryptoprocessor/ microcontroller within the new device that performs various cryptographic services (e.g., generating checksums from application/device states, signing data from keys securely stored within the TPM, providing secure storage, etc.). Thus, in one embodiment, processing logic leverages the abilities of the TPM to perform a challenge and response process for authenticating a device. The challenges, utilizing the capabilities of the TPM, can include supplying an attestation checksum, generating a new checksum based on an attestation checksum and a token, encrypting data with a private key of the TPM, etc.

Processing logic receives a response (e.g., checksum value(s), encrypted data, etc.) from the new device purported to have been generated by the TPM (processing block 454), and verifies the received response based at least in part on known public data associated with private data of the TPM (processing block 456). This can include, for example, processing logic regenerating an attestation checksum value based on expected configuration parameters, using a public key associated with a TPM private key to decrypt encrypted data, etc.

Figure 5:
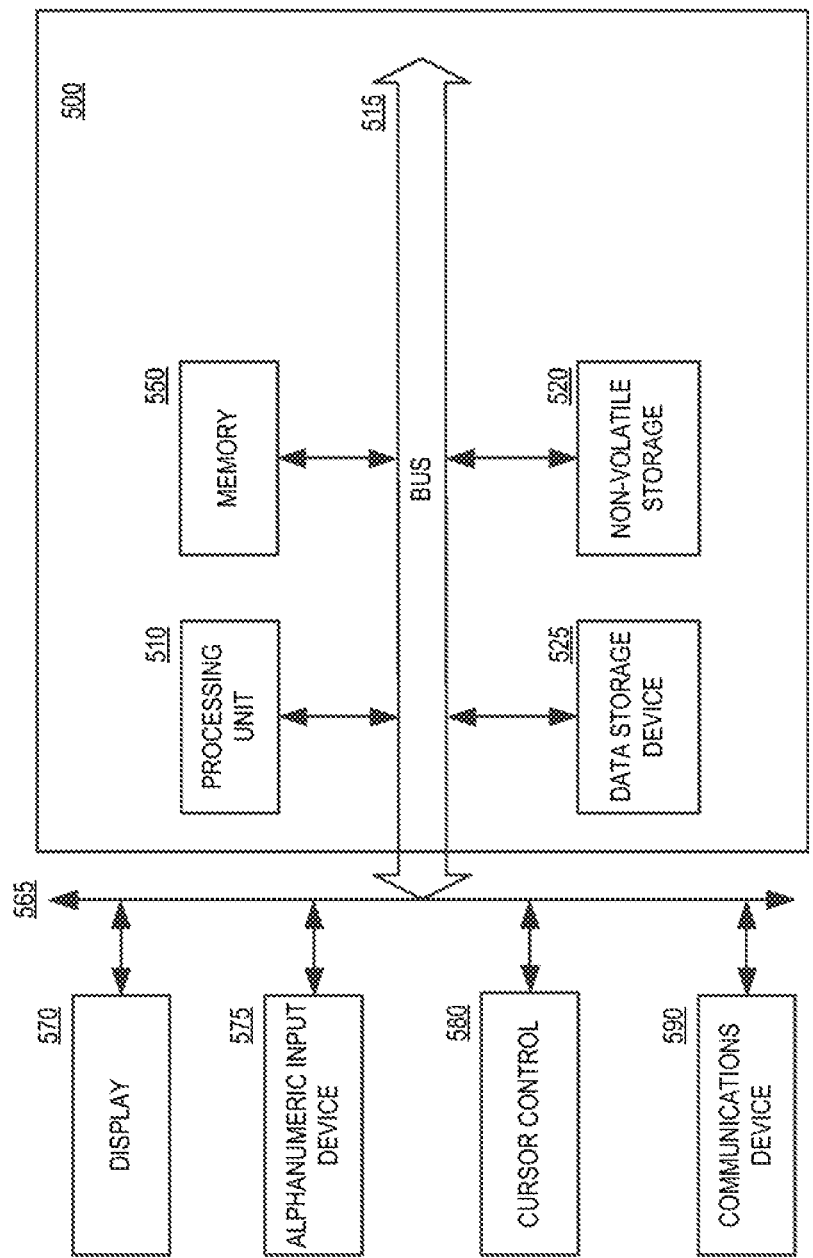
FIG. 5 is one embodiment of a computer system that may be used to support the systems and operations discussed herein.

FIG. 5 is one embodiment of a computer system that may be used to support the systems and operations discussed herein. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 650 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 610, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for a certificate authority system providing authentication to a plurality of devices associated with an organization, the method comprising:
   receiving, at the certificate authority system, a request from a device to sign authentication information of the device, wherein the device is associated with the organization;
   sending a challenge to the device comprising a request for a certificate signed by a manufacturer of the device;
   receiving a response to the challenge from the device comprising a certificate purported to be signed by the manufacturer of the device;
   verifying, by the certificate authority system with a system of the manufacturer of the device, that the certificate purported to be signed by the manufacturer of the device is a valid manufacturer certificate;
   analyzing one or more factors associated with the device, the one or more factors comprising a location of the device, a role of a user of the device within the organization, one or more permissions associated with a user of the device, one or more privileges of the user within the organization, a type of device, a purpose of the device, or a combination thereof;
   selecting a key of the certificate authority system associated with a level of trust based on the analysis of the one or more factors; and
   signing, in response to the verification that the certificate purported to be signed by the manufacturer of the device is the certificate signed by the manufacturer of the device, the authentication information of the device with one or more keys of the certificate authority system as a certificate authority system authentication of an identity of the device, wherein the one or more keys includes the key selected by the certificate authority system and signing the authentication information of the device with the selected key certifies the device as a trusted device having the level of trust when interacting with one or more other devices associated with the organization.

2. The method of claim 1, wherein the certificate purported to be signed by the manufacturer of the device comprises a manufacturer certificate of the identity of the device generated by the manufacturer during manufacturing of the device.

3. The method of claim 2, wherein the certificate purported to be signed by the manufacturer of the device is comprised in one or more hardware or software components of the device.

4. The method of claim 2, wherein the manufacturer certificate of the identity of the device comprises a cryptographic certificate of the identity of the device signed using one or more keys of the manufacturer.

5. The method of claim 1, further comprising:
   verifying, by the certificate authority system in response to verification that the certificate purported to be signed by the manufacturer of the device is valid, at least one additional trustworthiness requirement associated with the device.

6. The method of claim 1, wherein the device is a physical device having a trusted platform module, further comprising:
   verifying, by the certificate authority system in response to verification that the certificate purported to be signed by the manufacturer of the device is valid, at least one additional trustworthiness requirement associated with the device by obtaining, from the trusted platform module, an attestation that one or more device configuration parameters are consistent with one or more predetermined trusted device configuration parameters, wherein the attestation obtained from the trusted platform module comprises one or more attestation checksum values purported to have been generated using at least the one or more of software configurations and hardware configurations of the device;

regenerating, by the certificate authority system, the one or more attestation checksums using trusted software configurations and hardware configurations, wherein the one more device configuration parameters comprises one or more of software configurations and hardware configurations of the device; and verifying the at least one additional trustworthiness requirement associated with the device further comprises comparing the regenerated attestation checksums with the obtained one or more attestation checksums to determine whether the obtained one or more attestation checksums correspond with trusted software configurations and hardware configurations.

7. The method of claim 1, wherein sending the challenge to the device further comprises:

instructing a cloud services provider system to allow the device to perform an action at the cloud services provider;

instructing the device to perform the action at the cloud services provider, wherein the cloud services provider generates a response for the device as a result of performing the action at the request of the device; and receiving, from the device, the response generated by the cloud services provider;

verifying the response received from the device matches the response generated by the cloud services provider; and performing the signing in response to the verification by the certificate authority system of the match.

8. The method of claim 1, wherein sending the challenge to the device further comprises:

instructing the device to perform an action at the cloud services provider, wherein the action is known by the certificate authority system not to be allowed by the cloud services provider;

receiving, from the device, a response generated by the cloud services provider as a result of the device failing to perform the action at the cloud services provider, wherein the response comprises an error message generated by the cloud services provider;

verifying, with the cloud services provider, that the device attempted to perform the action at the cloud services provider that resulted in the error message; and performing the signing in response to verifying the error message with the cloud services provider.

9. The method of claim 1, wherein the authentication information comprises one or more of a key, a certificate, a password, and a serial number.

10. A non-transitory computer readable storage medium including instructions that, when executed by a processor, cause the processor to perform a method for a certificate authority system to provide authentication to a plurality of devices associated with an organization, the method comprising:

receiving, at the certificate authority system, a request from a device to sign authentication information of the device, wherein the device is associated with the organization;

sending a challenge to the device comprising a request for a certificate signed by a manufacturer of the device;

receiving a response to the challenge from the device comprising a certificate purported to be signed by the manufacturer of the device;

verifying, by the certificate authority system with a system of the manufacturer of the device, that the certificate purported to be signed by the manufacturer of the device is a valid manufacturer certificate;

analyzing one or more factors associated with the device, the one or more factors comprising a location of the device, a role of a user of the device within the organization, one or more permissions associated with a user of the device, one or more privileges of the user within the organization, a type of device, a purpose of the device, or a combination thereof;

selecting a key of the certificate authority system associated with a level of trust based on the analysis of the one or more factors; and signing, in response to the verification that the certificate purported to be signed by the manufacturer of the device is the certificate signed by the manufacturer of the device, the authentication information of the device with one or more keys of the certificate authority system as a certificate authority system authentication of an identity of the device, wherein the one or more keys includes the key selected by the certificate authority system and signing the authentication information of the device with the selected key certifies the device as a trusted device having the level of trust when interacting with one or more other devices associated with the organization.

11. The non-transitory computer readable storage medium of claim 10, wherein the certificate purported to be signed by the manufacturer of the device comprises a manufacturer certificate of the identity of the device generated by the manufacturer at a time of manufacturing of the device.

12. The non-transitory computer readable storage medium of claim 11, wherein the certificate purported to be signed by the manufacturer of the device is comprised in one or more hardware or software components of the device.

13. The non-transitory computer readable storage medium of claim 11, wherein the manufacturer certificate of the identity of the device comprises a cryptographic certificate of the identity of the device signed using one or more keys of the manufacturer.

14. The non-transitory computer readable storage medium of claim 10, further comprising:

verifying, by the certificate authority system in response to verification that the certificate purported to be signed by the manufacturer of the device is valid, at least one additional trustworthiness requirement associated with the device.

15. The non-transitory computer readable storage medium of claim 10, wherein the device is a physical device having a trusted platform module, further comprising:

verifying, by the certificate authority system in response to verification that the certificate purported to be signed by the manufacturer of the device is valid, at least one additional trustworthiness requirement associated with the device by obtaining, from the trusted platform module, an attestation that one or more device configuration parameters are consistent with one or more predetermined trusted device configuration parameters, wherein the attestation obtained from the trusted platform module comprises one or more attestation checksum values purported to have been generated using at least the one or more of software configurations and hardware configurations of the device;

regenerating, by the certificate authority system, the one or more attestation checksums using trusted software configurations and hardware configurations, wherein the one more device configuration parameters comprises one or more of software configurations and hardware configurations of the device; and verifying the at least one additional trustworthiness requirement associated with the device further comprises comparing the regenerated attestation checksums with the obtained one or more attestation checksums to determine whether the obtained one or more attestation checksums correspond with trusted software configurations and hardware configurations.

16. The non-transitory computer readable storage medium of claim 10, wherein sending the challenge to the device further comprises:
   instructing a cloud services provider system to allow the device to perform an action at the cloud services provider;
   instructing the device to perform the action at the cloud services provider, wherein the cloud services provider generates a response for the device as a result of performing the action at the request of the device; and
   receiving, from the device, the response generated by the cloud services provider;
   verifying the response received from the device matches the response generated by the cloud services provider; and
   performing the signing in response to the verification by the certificate authority system of the match.

17. The non-transitory computer readable storage medium of claim 10, wherein sending the challenge to the device further comprises:
   instructing the device to perform an action at the cloud services provider, wherein the action is known by the certificate authority system not to be allowed by the cloud services provider;
   receiving, from the device, a response generated by the cloud services provider as a result of the device failing to perform the action at the cloud services provider, wherein the response comprises an error message generated by the cloud services provider;
   verifying, with the cloud services provider, that the device attempted to perform the action at the cloud services provider that resulted in the error message; and
   performing the signing in response to verifying the error message with the cloud services provider.

18. A certificate authority system, comprising:
   a memory to store a plurality of cryptographic keys of the certificate authority system; and
   a processor coupled with the memory, the processor configured to:
   receive a request from a device to sign authentication information of the device, wherein the device is associated with the organization,
   send a challenge to the device comprising a request for a certificate signed by a manufacturer of the device,
   receive a response to the challenge from the device comprising a certificate purported to be signed by the manufacturer of the device,
   verify, with a system of the manufacturer of the device, that the certificate purported to be signed by the manufacturer of the device is a valid manufacturer certificate,
   analyzing one or more factors associated with the device, the one or more factors comprising a location of the device, a role of a user of the device within the organization, one or more permissions associated with a user of the device, one or more privileges of the user within the organization, a type of device, a purpose of the device, or a combination thereof;
   selecting a key of the certificate authority system associated with a level of trust based on the analysis of the one or more factors; and
   sign, in response to the verification that the certificate purported to be signed by the manufacturer of the device is the certificate signed by the manufacturer of the device, the authentication information of the device with one or more keys of the certificate authority system as a certificate authority system authentication of an identity of the device, wherein the one or more keys includes the key selected by the certificate authority system and signing the authentication information of the device with the selected key certifies the device as a trusted device having the level of trust when interacting with one or more other devices associated with the organization.

* * * * *